US012808614B2

(12) United States Patent
Farnell et al.

(10) Patent No.: US 12,808,614 B2
(45) Date of Patent: Nov. 24, 2026

(54) HEAT EXCHANGE REACTOR SEAL APPARATUS

(71) Applicant: Johnson Matthey Davy Technologies Limited, London (GB)

(72) Inventors: Peter William Farnell, Billingham (GB); Simon Graham, London (GB)

(73) Assignee: Johnson Matthey Davy Technologies Limited, London (GB)

(*) Notice: Subject to any disclaimer, the term of this patent is extended or adjusted under 35 U.S.C. 154(b) by 818 days.

(21) Appl. No.: 18/255,970

(22) PCT Filed: Feb. 8, 2022

(86) PCT No.: PCT/GB2022/050318
§ 371 (c)(1),
(2) Date: Jun. 5, 2023

(87) PCT Pub. No.: WO2022/180354
PCT Pub. Date: Sep. 1, 2022

(65) Prior Publication Data
US 2024/0035758 A1 Feb. 1, 2024

(30) Foreign Application Priority Data
Feb. 26, 2021 (GB) ..................................... 2102787

(51) Int. Cl.
*F28F 9/04* (2006.01)
*B01J 8/06* (2006.01)
(Continued)

(52) U.S. Cl.
CPC ............... *F28F 9/165* (2013.01); *B01J 8/067* (2013.01); *C01B 3/382* (2013.01); *C01B 3/384* (2013.01);
(Continued)

(58) Field of Classification Search
None
See application file for complete search history.

(56) References Cited

U.S. PATENT DOCUMENTS 3,600,141 A * 8/1971 Mevenkamp ............ B01J 8/062 422/510
3,935,225 A * 1/1976 Marsch .................. C01B 3/384 422/201
(Continued)

FOREIGN PATENT DOCUMENTS

CN 105547011 A 5/2016
CN 209672890 U 11/2019
(Continued)

*Primary Examiner* — Jennifer A Leung
(74) *Attorney, Agent, or Firm* — BakerHostetler

(57) ABSTRACT

A tube seal device suitable for use in a heat exchange reactor comprising one or more tubes is described, said tube seal device comprising a seal tube and an inner tube disposed within the seal tube to provide an overlapping region, said inner tube having within said overlapping region, (i) an interior constriction of reduced cross sectional area forming a low-pressure region, (ii) an expansion region adjacent the constriction of cross sectional area greater than that of the constriction, and (iii) one or more passages through the wall of the inner tube connecting said low-pressure region to the exterior of the inner tube, wherein the tube seal device further comprises one or more grooves formed around an inner face of the seal tube in the overlapping region corresponding to the low-pressure region of the inner tube.

20 Claims, 2 Drawing Sheets

Figure 1:
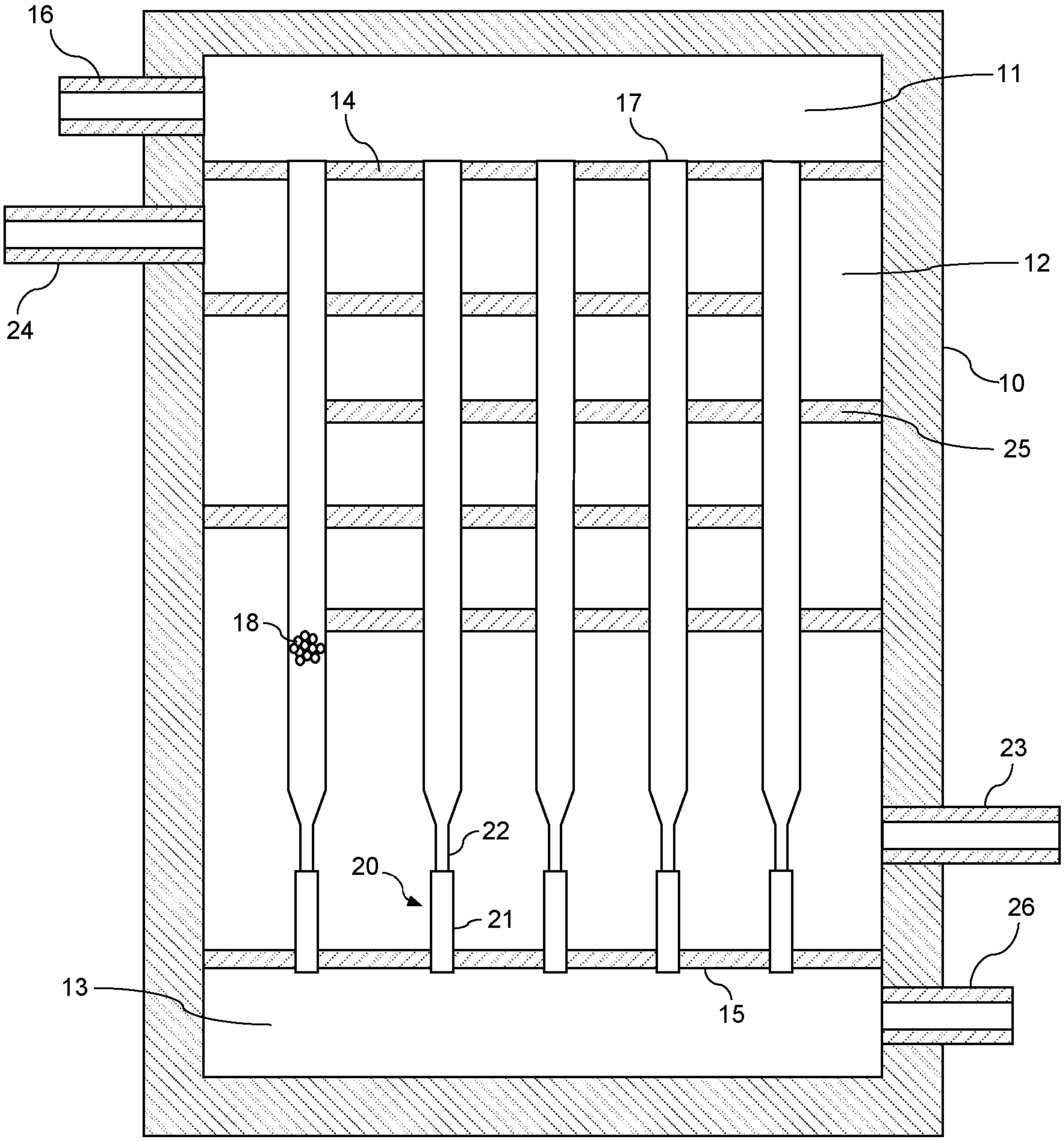

(51) Int. Cl.

| | |
|---|---|
| ***C01B 3/382*** | (2026.01) |
| ***C01B 3/384*** | (2026.01) |
| ***F28F 9/16*** | (2006.01) |

(52) U.S. Cl.

CPC ................ *B01J 2208/00221* (2013.01); *C01B 2203/0233* (2013.01); *C01B 2203/0261* (2013.01); *C01B 2203/142* (2013.01); *F28F 2230/00* (2013.01)

(56) References Cited

U.S. PATENT DOCUMENTS

| | | | | | |
|---|---|---|---|---|---|
| 4,647,436 | A * | 3/1987 | Herbort | C10G 11/00 | 285/329 |
| 7,731,935 | B2 * | 6/2010 | Brady | B01J 8/067 | 423/652 |
| 2005/0287053 | A1 * | 12/2005 | Sakai | B01J 8/065 | 422/607 |
| 2022/0234019 | A1 * | 7/2022 | Ruggeri | B01J 8/067 | |

FOREIGN PATENT DOCUMENTS

| | | | | |
|---|---|---|---|---|
| CN | 111306968 | B | 10/2024 | |
| EP | 0 983 964 | A2 | 3/2000 | |
| JP | 2003-520747 | A | 7/2003 | |
| WO | 97/05947 | A1 | 2/1997 | |
| WO | 01/55027 | A1 | 8/2001 | |
| WO | WO-2006117572 | A1 * | 11/2006 | C01B 3/382 |

* cited by examiner

HEAT EXCHANGE REACTOR SEAL APPARATUS

This invention relates to seal apparatus and its use in a heat exchange reactors and processes using such apparatus, in particular in catalytic steam reforming processes.

In heat exchange reactor apparatus containing externally heated tubes, there is liable to be significant differential thermal expansion between tubes carrying the process fluid and means, such as a tube sheet, defining a boundary of a zone through which a heat exchange medium passes in heat exchange with the process fluid passing through the tubes. Where tubes are heated by a heat exchange medium flowing around the exterior of the tubes that is at a lower pressure than the process fluid passing through the tubes, one solution has been to employ a seal device connected to each tube comprising a seal tube and movably disposed within the seal tube an inner tube having a constriction that provides a low-pressure region and which also has passages though the wall of the inner tube connecting the low-pressure region to the exterior of the inner tube. In this way, process fluid mixing with the heat exchange medium is prevented or reduced. WO9705947 discloses such apparatus.

The Applicant has found that disrupting the flow of heat exchange medium within the seal device by creating turbulence in the annular space between the exterior of the inner tube and the interior of the seal tube can reduce the amount of mixing of the heat exchange medium with the process fluid.

Accordingly, the invention provides a tube seal device suitable for use in a heat exchange reactor comprising one or more tubes, said tube seal device comprising a seal tube and an inner tube disposed within the seal tube to provide an overlapping region, said inner tube having within said overlapping region, (i) an interior constriction of reduced cross sectional area forming a low-pressure region, (ii) an expansion region adjacent the constriction of cross sectional area greater than that of the constriction, and (iii) one or more passages through the wall of the inner tube connecting said low-pressure region to the exterior of the inner tube, wherein the tube seal device further comprises one or more grooves formed around an inner face of the seal tube in the overlapping region corresponding to the low-pressure region of the inner tube.

The invention further provides a heat exchange reactor comprising one or more heat exchange tubes comprising the tube seal device and a process using the reactor and tube seal device.

The heat exchange reactor apparatus including the tube seal device is of particular utility where heat exchange medium flowing around the exterior of the tubes is at a lower pressure than a process fluid passing through the tubes.

By providing the grooves on the interior of the seal tube rather than on the exterior of the inner tube, fouling of the inner tube by material being carried there by the heat exchange medium is reduced. This improves the long-term performance of the tube seal device and can simplify maintenance by allowing the fouled seal tube to be replaced during routine maintenance. Moreover, providing the grooves on the interior of the seal tube allows potentially a greater number of grooves to be present.

To reduce mixing of the process fluid and heat exchange medium further, there may additionally be one or more grooves in the overlapping region corresponding to the expansion region of the inner tube. The one or more grooves in the expansion region may be on an outer face of the inner tube or on the inner face of the seal tube. Preferably, the one or more grooves in the overlapping region corresponding to the expansion region of the inner tube are disposed on the outer face of the inner tube because this simplifies fabrication.

Heat exchange reactor apparatus including the tube seal device may include a process fluid feed zone, a heat exchange zone, and a process fluid off-take zone, first and second boundary means separating said zones from one another, one or more heat exchange tubes fastened to one of said boundary means and extending through the heat exchange zone. Process fluid can flow from the process fluid feed zone, through the one or more heat exchange tubes and into the process fluid off-take zone. For each heat exchange tube, a tube seal device is provided. The seal tube of the tube seal device may be fastened to one of said boundary means. The inner tube of the tube seal device is provided on each heat exchange tube. The seal tube is disposed substantially coaxially with the inner tube such that the inner tube is in sliding engagement with its associated seal tube thereby forming the overlapping region.

Each inner tube of the tube seal device is provided with (i) an interior constriction of reduced cross sectional area forming a low-pressure region within the inner tube, (ii) an expansion region of cross sectional area greater than that of the constriction downstream of said constriction, and (iii) one or more passages through the wall of the inner tube connecting said low-pressure region to the exterior of the inner tube, said passages being located within said overlapping region thereby providing a flow path for fluid from the heat exchange zone through said overlapping region into said low-pressure region within said inner tube.

Each tube seal device comprises one or more grooves formed around an inner face of the seal tube in the overlapping region corresponding to the low-pressure region of the inner tube.

In a heat exchange reactor of the above type, a process fluid is passed from a process fluid feed zone, through one or more heat exchange tubes disposed within a heat exchange zone defined by a casing through which a heat exchange medium passes, and then into a process fluid off-take zone. Means, such as tube sheets, are provided to separate the zones. Thus a tube sheet may separate the heat exchange zone through which the heat exchange medium passes from a zone, such as a plenum chamber, communicating with the interior of the heat exchange tubes to permit feed of process fluid to the tubes or off-take of process fluid from the tubes. An alternative arrangement involves the use of header pipes disposed within the heat exchange zone to define the process fluid feed zone: the process fluid is fed to the header pipes from whence it flows into and through the heat exchange tubes. Similarly, header pipes may be provided for the off-take of process fluid from the tubes. Alternatively, there may be a combination of tube sheets and header pipes. Such tube sheets or headers are herein termed boundary means as they define boundaries between the heat exchange zone and the process fluid feed and off-take zones.

By providing the inner tube on the heat exchange tube and by connecting the seal tube to the boundary means in the heat exchange reactor, longitudinal movement caused by thermal expansion and contraction of the heat exchange tubes may be accommodated.

In use, because of the low-pressure region in the inner tube, heat exchange medium may be drawn into the interior of the inner tube where it mixes with the process fluid flowing through the inner tube.

The heat exchange reactor may contain one or more heat exchange tubes, for example 1 to 10 tubes, but heat exchange reactors, for example used in steam reforming processes, may contain tens or even hundreds of tubes, for example 10 to 2000 tubes. The tubes may be 25-150 mm internal diameter and the wall thickness of the tubes may be in the range 2-13 mm depending on the size of the tubes. The tubes may be 5-15 metres in length. It is at such lengths, particularly at 10-15 metres, that the longitudinally expansion becomes particularly problematic without the use of the tube seal device. The tubes may be fabricated from suitable metals such as stainless steel. The heat exchange reactor may comprise one or more transverse baffles to cause the heat exchange medium to move in a serpentine manner through the heat exchange zone and thereby enhance the exchange of heat.

The tube seal device comprises an inner tube. The inner tube may be connected to one end of the heat exchange tube or may be formed as an end portion of the heat exchange tube. The inner tube may have the same diameter as the heat exchange tube or, preferably, a narrower diameter than the heat exchange tube. The inner tube may be polygonal or cylindrical but is preferably shaped so that an even clearance space is formed between the outer face of the inner tube and the inner face of the seal tube in the overlapping region. The inner tube has an internal constriction forming a low-pressure region within the tube and an expanded portion adjacent the constriction forming an expansion zone within the tube. One or more passages through the wall of the inner tube connect the low-pressure region with the exterior of the inner tube. There may be between 1 and 20 passages connecting the low-pressure region with the exterior of the inner tube. The passages are desirably evenly spaced to open into the clearance space between the inner tube and the seal tube. In use, the device is orientated such that the expansion zone is located downstream of the low-pressure zone. For example, in a vertical down-flow arrangement, with the tube seal device located at the lowermost end of the heat exchange tube, the expansion region will be below the constriction in the inner tube. The relative sizes of the constriction, low-pressure region and expansion region will depend in part on the tube size. For example, in one embodiment including a heat exchange tube of internal diameter about 100 mm, the portion of tubes forming the inner tube may have an internal dimension of about 25 mm, tapering internally to a constriction of about 12 mm internal diameter opening into a low-pressure region of about 18 mm internal diameter and about 108 mm length. At the end of the low-pressure region, the inner tube may be flared from the 18 mm diameter to about 31 mm external diameter over a length of about 78 mm. Twelve evenly spaced passages of 3 mm diameter may be provided between the low-pressure region and the exterior of the inner tube.

A clearance space, for example an annular gap, will exist between the inner face of the seal tube and the outer face of the inner tube in the overlapping region. The inner tube is thereby free to move longitudinally within the seal tube. The thickness of the clearance gap between the inner face of the seal tubes and the exterior face of the inner tube part of the heat exchange tubes may be about 0.1 to 0.5 mm. For example, in the embodiment described above, the gap may be about 0.2 mm.

The tube seal device also comprises a seal tube. The seal tube may be polygonal or cylindrical, but preferably has the same form as the inner tube so that an even clearance space is maintained. Tube seal devices comprising cylindrical seal tubes and cylindrical inner tubes are preferred because these are simpler to fabricate and are better adapted for use at elevated temperature under pressure.

The tube seal device comprises one or more grooves on the inner face of the seal tube. The one or more grooves on the inner face of the seal tube are formed on the inner face of the seal tube in the overlapping region corresponding to the low-pressure region of the inner tube. The one or more grooves on the inner face of the seal tube may be formed as crenellations, i.e. having a square or rectangular form, or the grooves may be U-shaped, V-shaped, or any combination of these. Square or rectangular-shaped grooves may provide improved turbulence in the overlapping region.

The grooves may be formed by cutting one or more channels into the inner face of the seal tube device. Alternatively, the grooves may be formed without cutting, for example by using a layered arrangement of different inside diameter rings inside the seal tube device, or by rolling a grooved profile in the seal tube device.

The size of the grooves may be from 2 to 20 mm in width, e.g. 6 to 14 mm in width, and 1 to 7 mm in depth depending on the size of the tube and the thickness of the tube wall. Desirably, the groove depth is no more than about 50% of the tube wall thickness for strength reasons. There may be between 1 and 30 grooves, e.g. between 2 and 25 grooves, preferably between 5 and 20 grooves, located on the seal tube in the overlapping region corresponding to the low-pressure region of the inner tube. This is an improvement over devices where the grooves are located on the inner tube where the number of grooves in this region is limited by the size of the inner tube to 8 or less. By placing the grooves on the inner wall of the seal tube, the grooves may extend beyond the low-pressure region.

There may additionally be one or more grooves in the overlapping region corresponding to the expansion region of the inner tube. Whether the one or more grooves are on the outer face of the inner tube or on the inner face of the seal tube, they may also be formed as crenellations, i.e. having a square or rectangular form, or the grooves may be U-shaped, V-shaped, or any combination of these. The size of the grooves in this region may also be from 2 to 20 mm in width, e.g. 6 to 14 mm in width, and 1 to 7 mm in depth. There may be the same number or a greater number of grooves in the expansion region than in the low-pressure region. For example, there may be between 1 and 30 grooves, e.g. between 2 and 25 grooves, preferably between 5 and 20 grooves, located on the inner face of the seal tube or the outer face of the inner tube in the overlapping region corresponding to the expansion region of the inner tube.

The one or more grooves are desirably arranged to disrupt the flow of gas through the tube seal device. The one or more grooves may be arranged perpendicular to the flow of process fluid through the inner tube, or the grooves may be formed in a spiral manner, such as a screw thread.

Where two or more grooves are present, in either the low-pressure or expansion regions, they are preferably parallel to each other.

The invention further provides a process comprising the steps of: (a) feeding a process fluid to a heat exchange reactor having a process fluid feed zone separated from a heat exchange zone by boundary means; (b) passing said process fluid from said process fluid feed zone through one or more heat exchange tubes extending through said heat exchange zone, wherein said process fluid is subjected to heat exchange with a heat exchange medium at a lower pressure than the process fluid passing through the tubes in said heat exchange zone; (c) passing the process fluid from said heat exchange tubes to a process fluid off-take zone separated from said heat exchange zone by second boundary means; (d) subjecting the process fluid from said process fluid off-take zone to a further processing step, and; (e) passing the resultant processed process fluid through the heat exchange zone as the heat exchange medium, wherein each of said one or more heat exchange tubes is fastened to one of said boundary means and engages with the other of said boundary means by means of a tube seal device, wherein the tube seal device comprises a seal tube fastened to the other of said boundary means and an inner tube connected to each heat exchange tube and disposed within the seal tube to provide an overlapping region, said inner tube having within said overlapping region, (i) an interior constriction of reduced cross sectional area forming a low-pressure region, (ii) an expansion region of cross sectional area greater than that of the constriction downstream, in the direction of flow of said process fluid, of said low-pressure region, and (iii) one or more passages through the wall of the inner tube connecting said low-pressure region to the exterior of the inner tube, wherein the tube seal device comprises one or more grooves formed around an inner face of the seal tube in the overlapping region corresponding to the low-pressure region of the inner tube.

In the process, part of the processed process fluid fed to the heat exchange zone passes into the tube seal device and through the one or more passages into the low pressure region.

In the process, the heat exchange medium is the process fluid that has passed through the tubes, but which has been subjected to further processing before being used as the heat exchange medium. This further processing preferably includes a step in which the process fluid is heated such that the heat exchange medium imparts heat to the one or more heat exchange tubes.

The tube seal device is of particular utility in a heat exchange steam reformer, or gas-heated reformer, i.e. a heat exchange reactor containing a one or more externally heated tubes containing a steam reforming catalyst through which a reformer feed is passed to generate a synthesis gas, and wherein the heat exchange is medium used to heat the tubes. In such processes the heat exchange medium is typically at lower pressure than the reformer feed.

The process and apparatus are of particular utility for steam reforming hydrocarbons wherein a mixture of a hydrocarbon feedstock and steam is passed through the heat exchange tubes which contain a steam reforming catalyst, for example a nickel-containing steam reforming catalyst, so as to form a primary reformed gas which is then subjected to partial combustion with an oxygen-containing gas and the resultant partially combusted gas is used as the heat exchange medium in the heat exchange zone. Preferably the partially combusted gas is passed through a bed of a secondary reforming catalyst, so as to effect further reforming, before being used as the heat exchange medium.

As a result of the constriction in the inner tube, a low-pressure region is formed within the inner tube: by suitably sizing the constriction, the pressure in the low-pressure region when in normal operation can be made lower than the pressure in the heat exchange zone so that there is a flow of heat exchange medium, e.g. the product of secondary reforming the process fluid taken from the process fluid off-take zone, from the heat exchange zone through the clearance space between the seal tube and the inner tube and through said passages in the wall of the inner tube into the low-pressure region. Downstream of the low-pressure region the process fluid expands in the expansion region giving a process fluid pressure greater than that in the low-pressure region. Consequently, there can also be a backflow, or recycle, of process fluid from the outlet end of the inner tube, through the clearance space, to the passages and into the low-pressure region.

The tube seal device is preferably provided at the boundary means between the heat exchange zone and the process fluid off-take zone. Thus, the seal tubes are preferably fastened to that boundary means while the one or more heat exchange tubes comprising the inner tubes are fastened to the boundary means, e.g. tube sheet, between the process fluid inlet zone and the heat exchange zone. In this arrangement, the inner tubes are formed at the end of the heat exchange tubes adjacent the boundary means between the heat exchange zone and the process fluid off-take zone and therefore engage with the seal tubes at this boundary means to form the tube seal device. This is especially preferred where the process fluid undergoes a substantial pressure drop as it passes through the heat exchange tubes, for example where the latter contain a catalyst. The seal tubes may project into the heat exchange zone from the boundary means or may extend back from the boundary means into the process fluid off-take zone, on the other side of the boundary means.

In steam reforming, hydrocarbon feedstock is typically a methane-containing gas. During the reforming process, methane reacts with steam to produce hydrogen and carbon oxides. Any hydrocarbons containing two or more carbon atoms that are present are converted to methane, carbon monoxide and hydrogen. Steam reforming reactions take place in the tubes over the steam reforming catalysts at temperatures above 350 °C and typically the process fluid exiting the tubes is at a temperature in the range 650 to 950 °C. The heat exchange medium flowing around the outside of the tubes may have a temperature in the range 500 to 2000 °C.

The apparatus and process may be used as part of a process for the manufacture of hydrogen, methanol, dimethyl ether, olefins, ammonia, urea or hydrocarbon liquids, e.g. diesel fuels, obtained by the Fischer-Tropsch synthesis. Thus, a reformed gas mixture obtained using the apparatus or in the process of the present invention may be subjected to further process steps including a step of hydrogen separation, methanol synthesis, dimethyl ether synthesis, olefin synthesis, ammonia synthesis, or hydrocarbon liquid synthesis. Known processes may be used to accomplish these steps.

Although described above primarily in relation to heat exchange steam reforming, it will be appreciated that the invention is also of utility in other heat exchange applications where considerable differential thermal expansion has to be accommodated and leakage of the heat exchange medium into the process fluid is not objectionable. Examples include feed/effluent heat exchangers, for example where the feed to a process step such as an exothermic reaction, e.g. methanol or ammonia synthesis, is heated by heat exchange with the effluent from the process step. In such cases, the heat exchange tubes may be free of catalyst unless it is desired, as in the aforementioned reforming process, that a catalytic reaction is effected on the process fluid while it is undergoing the heat exchange.

Figure 2:
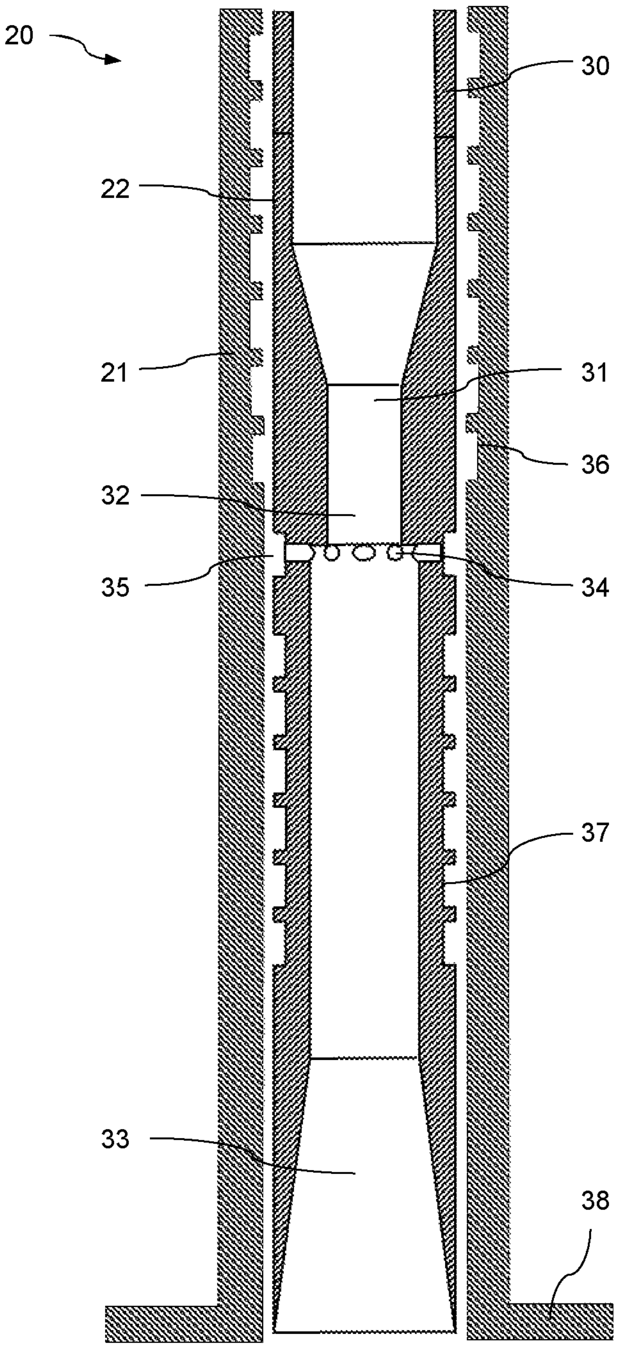

The invention is further illustrated by reference to the accompanying drawings wherein:

FIG. 1 is a diagrammatic cross section of a heat exchange reactor containing a tube seal device according to one embodiment of the invention, wherein the boundary means are tube sheets; and FIG. 2 is a cross section of a tube seal device according to one embodiment of the invention.

In FIG. 1 there is shown a heat exchange steam reformer, having an outer insulated pressure shell 10 enclosing three zones 11, 12, 13, defined by the shell wall and tube sheets 14 and 15. Zone 11, a process fluid feed zone, is defined by the shell wall 10 and tube sheet 14. It is provided with a process fluid supply conduit 16 and has a plurality of vertical tubes, 17 fastened to, and extending downwards from, tube sheet 14. The number of tubes employed will depend on the scale of operation: although only five tubes are shown, there may be typically be 50 or more such tubes. The tubes 17 are filled with a steam reforming catalyst 18, for example multi-holed cylindrical pellets of a refractory oxide-supported nickel catalyst and/or a structured steam reforming catalyst. Zone 12, a heat exchange zone, is defined by the shell wall 10 and tube sheets 14 and 15. The heat exchange tubes 17 extend through the heat exchange zone 12 and engage with tube seal devices 20. The tube seal devices 20 each comprise a seal tube 21 fixed to the tube sheet 15 that engage, in the heat exchange zone 12, with catalyst-free inner tube sections 22 extending from the bottom of the catalyst-filled tubes 17. The heat exchange zone 12 is fed with a heating medium, e.g. a synthesis gas produced by autothermal or secondary reforming, via a conduit 23 positioned in the shell 10 near the bottom of the tubes 17. The heating medium passes upward in the heat exchange zone where it exchanges heat with the tubes 17 and is then removed from the heat exchange zone 12 via a conduit 24 positioned in the shell 10 near the top of the tubes 17. Transverse baffles 25 act to divert the heating medium horizontally across the reformer and enhance its heat exchange with the tubes 17. Zone 13, the process fluid off-take zone, is defined by the wall of shell 10 and the tube sheet 15. The tube seal devices 20 are open-ended and extend through the tube sheet 15 into the off-take zone 13. The reformed gases pass from the tubes 17 through the tube seal devices 20 and into the off-take zone 13 from which they are removed by a process fluid off-take conduit 26.

In use, a process fluid comprising hydrocarbon and steam is fed at elevated temperature and pressure through the conduit 16 to the process fluid feed zone 11 and thence downward through the catalyst-filled tubes 17. Heat is exchanged with heating medium in the heat exchange zone 12 and steam reforming reactions take place. The gas mixture undergoing reforming passes through the tubes 17 and thence though tube seal devices 20 to the off-take zone 13 from which it is removed by the off-take conduit 26. A reformed gas recovered from the off-take conduit 26 is subjected to further processing in which it is heated, in particular by autothermal or secondary reforming, and the further processed gas passed to the heat exchange reformer via conduit 23 as the heat exchange medium. The pressure of the heat exchange medium fed via conduit 23 is lower than the gas passing though the tubes 17.

In FIG. 2, a tube seal device 20 is depicted orientated vertically and arranged for downflow though the device in accordance with the embodiment depicted in FIG. 1. The tube seal device 20 comprises an outer seal tube 21 and an inner tube 22. The inner tube 22 is located inside the seal tube 21 to provide an overlapping region and is free to slide vertically. In use, the inner tube 22 is fixed to a lowermost portion 30 of a heat exchange tube. The lowermost portion of the heat exchange tube 30 and connected part of the inner tube 22 have an internal diameter of 25 mm and are free of catalyst. The inner tube 22 tapers from the internal diameter of 25 mm to a constriction 31 of 12 mm internal diameter and expands from the constriction 31 to a low-pressure region 32 of 18 mm internal diameter and 108 mm length. The inner tube flares from the 18 mm diameter of the low-pressure region 32 to 31 mm external diameter in an expansion region 33 over a length of 78 mm. Twelve passages 34 of 3 mm diameter are provided between the low-pressure region 32, downstream of the constriction 31, and an annular clearance gap 35 between the inner surface of the seal tube 21 and the outer surface of the inner tube 22. The thickness of the annular clearance gap 35 between seal tube 21 and the exterior surface of the inner tube 22 is 0.2 mm.

The seal tube 21 comprises seven parallel 7 mm wide square-cut grooves 36 cut into the inner surface of the seal tube 21 facing the inner tube 22 in the overlapping region. The grooves extend from a position in the low pressure region 32 adjacent the passages 34 upwards towards and beyond where the inner tube 22 is connected to the lowermost portion 30 of the heat exchange tubes. It may be seen that providing the grooves in this way allows for a greater number to be present than if they were cut onto the exterior surface of the inner tube 22.

In this embodiment, a further six parallel 7 mm wide square-cut grooves 37 are cut into the exterior surface of the inner tube 22 from a position adjacent the passages 34 downwards towards the expansion region 33.

The lengths of the inner tube 22 and seal tube 21 are such that the passages 34 and open ends of the inner tube 22 are within the seal tubes 21 both at start up, i.e. with the apparatus at ambient temperature and at normal operating temperature.

A flange 38 is provided on a lowermost portion of the seal tube 21, beyond the end of the overlapping region, to enable fixing of the tube seal device 20 to a tubesheet.

The invention claimed is:

1. A tube seal device suitable for use in a heat exchange reactor comprising one or more tubes, said tube seal device comprising a seal tube and an inner tube disposed within the seal tube to provide an overlapping region, said inner tube having within said overlapping region, (i) an interior constriction of reduced cross sectional area forming a low-pressure region, (ii) an expansion region adjacent the constriction of cross sectional area greater than that of the constriction, and (iii) one or more passages through the wall of the inner tube connecting said low-pressure region to the exterior of the inner tube, wherein the tube seal device further comprises one or more grooves formed around an inner face of the seal tube in the overlapping region corresponding to the low-pressure region of the inner tube.

2. The tube seal device according to claim 1, wherein one or more grooves are additionally provided in the overlapping region corresponding to the expansion region of the inner tube.

3. The tube seal device according to claim 2, wherein the one or more grooves in the expansion region are provided on an outer face of the inner tube or on the inner face of the seal tube.

4. The tube seal device according to claim 2, wherein the one or more grooves in the overlapping region corresponding to the expansion region are provided on an outer face of the inner tube.

5. The tube seal device according to claim 1, comprising between 1 and 30 grooves, located on the seal tube in the overlapping region corresponding to the low-pressure region of the inner tube.

6. The tube seal device according to claim 1, wherein the one or more grooves have a square or rectangular form, or are U-shaped, V-shaped, or any combination of these.

7. The tube seal device according to claim 1, wherein the one or more grooves have a width in the range of 2 to 20 mm.

8. The tube seal device according to claim 1, comprising between 5 and 20 grooves located on the seal tube in the overlapping region corresponding to the low-pressure region of the inner tube.

9. The tube seal device according to claim 1, wherein the one or more grooves have a width in the range of 6 to 14 mm.

10. A heat exchange reactor comprising one or more heat exchange tubes comprising the tube seal device of claim 1.

11. The heat exchange reactor according to claim 10, comprising a process fluid feed zone, a heat exchange zone, and a process fluid off-take zone, first and second boundary means separating said zones from one another, wherein the one or more heat exchange tubes are fastened to one of said boundary means and extending through the heat exchange zone, and a tube seal device for each of the one or more heat exchange tubes comprise the tube seal device, said tube seal device comprising a seal tube and an inner tube, wherein the seal tube of the tube seal device is fastened to the other one of said boundary means and disposed substantially coaxially with the inner tube such that the inner tube is in sliding engagement with its associated seal tube thereby forming the overlapping region.

12. The heat exchange reactor according to claim 11, wherein the one or more heat exchange tubes contain a steam reforming catalyst.

13. The heat exchange reactor according to claim 11, comprising one or more transverse baffles in the heat exchange zone.

14. The heat exchange reactor according to claim 11, wherein each tube seal device is fastened to the boundary means between the heat exchange zone and the off-take zone.

15. A system comprising: a heat exchange steam reformer comprising the heat exchange reactor according to claim 11, configured such that a process fluid supplied to the process fluid feed zone flows through the one or more heat exchange tubes to the process fluid off-take zone and is removed from the process fluid off-take zone as a processed gas; and a partial combustion means operatively connected to the heat exchange steam reformer, the partial combustion means receiving the processed gas from the heat exchange steam reformer and effecting a partial combustion of the process gas to provide a partially-combusted process gas, and the partial combustion means supplying the partially-combusted process gas to the heat exchange zone of the heat exchange steam reformer for use as a heat exchange medium.

16. The system according to claim 15, wherein the partial combustion means includes a bed of reforming catalyst through which the partially combusted process gas passes to produce a reformed gas, and passing the reformed gas to the heat exchange zone of the heat exchange reformer for use as the heat exchange medium.

17. A process comprising the steps of: (a) feeding a process fluid to a heat exchange reactor having a process fluid feed zone separated from a heat exchange zone by first boundary means; (b) passing said process fluid from said process fluid feed zone through one or more heat exchange tubes extending through said heat exchange zone, wherein said process fluid is subjected to heat exchange with a heat exchange medium at a lower pressure than the process fluid passing through the one or more heat exchange tubes in said heat exchange zone; (c) passing the process fluid from said one or more heat exchange tubes to a process fluid off-take zone separated from said heat exchange zone by second boundary means; (d) subjecting the process fluid from said process fluid off-take zone to a further processing step to produce a processed process fluid, and; (e) passing the processed process fluid through the heat exchange zone as the heat exchange medium, wherein each of said one or more heat exchange tubes is fastened to one of said boundary means and engages with the other of said boundary means by means of a tube seal device, wherein the tube seal device comprises a seal tube fastened to the other of said boundary means and an inner tube connected to each heat exchange tube and disposed within the seal tube to provide an overlapping region, said inner tube having within said overlapping region, (i) an interior constriction of reduced cross sectional area forming a low-pressure region, (ii) an expansion region of cross sectional area greater than that of the constriction downstream, in the direction of flow of said process fluid, of said low-pressure region, and (iii) one or more passages through the wall of the inner tube connecting said low-pressure region to the exterior of the inner tube, wherein the tube seal device comprises one or more grooves formed around an inner face of the seal tube in the overlapping region corresponding to the low-pressure region of the inner tube.

18. The process according to claim 17, wherein the heat exchange reactor is configured as a heat exchange reformer in which the one or more heat exchange tubes contain a steam reforming catalyst and the process fluid fed to the heat exchange reactor comprises a reformer feed, wherein the reformer feed is passed through the one or more heat exchange tubes to generate a synthesis gas, and wherein the heat exchange medium used to heat the one or more heat exchange tubes is at a lower pressure than the reformer feed.

19. The process according to claim 18, wherein the further processing step comprises a partial combustion step that is performed by a partial combustion means operatively connected to the heat exchange reformer, the partial combustion means receiving the synthesis gas from the heat exchange reformer and effecting a partial combustion of the synthesis gas to provide a processed synthesis gas as the processed process fluid passed through the heat exchange zone as the heat exchange medium.

20. The process according to claim 19, wherein the partial combustion means includes a bed of reforming catalyst through which a partially combusted gas passes to produce the processed synthesis gas as the processed process fluid passed through the heat exchange zone as the heat exchange medium.

* * * * *